United States Patent
Lee et al.

(10) Patent No.: US 10,671,307 B2
(45) Date of Patent: Jun. 2, 2020

(54) STORAGE SYSTEM AND OPERATING METHOD THEREOF

(71) Applicant: Samsung Electronics Co., Ltd., Suwon-si, Gyeonggi-do (KR)

(72) Inventors: Jeong-ho Lee, Gwacheon-si (KR); Ho-jun Shim, Yongin-si (KR); Won Woo Ro, Seoul (KR); Won Seob Jeong, Seoul (KR); Myung Kuk Yoon, Seoul (KR); Won Jeon, Seoul (KR)

(73) Assignees: Samsung Electronics Co., Ltd., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 139 days.

(21) Appl. No.: 15/869,393

(22) Filed: Jan. 12, 2018

(65) Prior Publication Data

US 2018/0357005 A1    Dec. 13, 2018

(30) Foreign Application Priority Data

Jun. 7, 2017 (KR) .................. 10-2017-0070960

(51) Int. Cl.
*G06F 3/06* (2006.01)
*G06K 9/00* (2006.01)
*G06K 9/62* (2006.01)

(52) U.S. Cl.
CPC .......... *G06F 3/0643* (2013.01); *G06F 3/0611* (2013.01); *G06F 3/0613* (2013.01); *G06F 3/0679* (2013.01); *G06K 9/00993* (2013.01); *G06K 9/6201* (2013.01)

(58) Field of Classification Search
CPC ...... G06F 3/0643; G06F 16/17; G06F 3/0602; G06K 9/62
See application file for complete search history.

(56) References Cited

U.S. PATENT DOCUMENTS

| | | | |
|---|---|---|---|
| 8,091,115 | B2 | 1/2012 | Abzarian et al. |
| 8,966,182 | B2 | 2/2015 | Biran et al. |
| 9,064,116 | B2 | 6/2015 | Triantafillou et al. |
| 9,246,928 | B2 | 1/2016 | Atasu et al. |
| 9,336,135 | B1 | 5/2016 | Salessi et al. |
| 9,514,246 | B2 | 12/2016 | Billa et al. |
| 2005/0273450 | A1 | 12/2005 | McMillen et al. |
| 2009/0150646 | A1* | 6/2009 | Allen ................. G06F 12/0246 711/213 |

(Continued)

*Primary Examiner* — Nathan Sadler
(74) *Attorney, Agent, or Firm* — Harness, Dickey & Pierce, P.L.C.

(57) ABSTRACT

Provided is a removable storage system including: a data storage device configured to store a plurality of files including a first file and a second file; a host interface configured to receive, from a host, a pattern matching request including pattern information and file information regarding the plurality of files, and transmit, to the host, a result of pattern matching regarding the plurality of files; and a pattern matching accelerator configured to perform the pattern matching in response to the pattern matching request, wherein the pattern matching accelerator includes a scan engine configured to scan data based on a pattern, and a scheduler configured to control the scan engine to stop scanning the first file and start scanning the second file.

20 Claims, 15 Drawing Sheets

(56) References Cited

U.S. PATENT DOCUMENTS

| | | | |
|---|---|---|---|
| 2013/0013549 A1* | 1/2013 | Chang | G06Q 10/00 |
| | | | 706/48 |
| 2013/0198445 A1* | 8/2013 | Bando | G11C 15/04 |
| | | | 711/108 |
| 2016/0170892 A1 | 6/2016 | Hall et al. | |
| 2016/0274936 A1* | 9/2016 | Garg | G06F 9/52 |
| 2016/0292229 A1 | 10/2016 | Jo | |

* cited by examiner

STORAGE SYSTEM AND OPERATING METHOD THEREOF

CROSS-REFERENCE TO RELATED APPLICATION

This application claims the benefit of Korean Patent Application No. 10-2017-0070960, filed on Jun. 7, 2017, in the Korean Intellectual Property Office, the disclosure of which is incorporated herein in its entirety by reference.

BACKGROUND

The inventive concept relates to a storage system, and more particularly, to a storage system for performing pattern matching and an operating method of the storage system.

A storage system may, in response to a request made by a host, store data received from the host or provide stored data to the host. The host may store or read data by communicating with the storage system, and may perform an intended operation by processing data. At least some of the operations of the host using data stored in the storage system may include an operation of searching the data stored in the storage system for matching the data with a certain pattern. When the amount of data stored in the storage system is very large, performing such pattern matching may be an excessive load on the host, and as a result, performance of the host may be degraded.

SUMMARY

The inventive concept provides a storage system, and more particularly, a storage system for performing pattern matching and an operating method of the storage system.

According to an aspect of the inventive concept, there is provided a storage system removably connected to a host, the storage system including: a data storage device configured to store a plurality of files including a first file and a second file; a host interface configured to receive, from the host, a pattern matching request including pattern information and file information regarding the plurality of files, and transmit, to the host, a result of pattern matching regarding the plurality of files; and a pattern matching accelerator configured to perform the pattern matching in response to the pattern matching request, wherein the pattern matching accelerator includes a scan engine configured to scan data based on a pattern, and a scheduler configured to control the scan engine to stop scanning the first file and start scanning the second file.

According to another aspect of the inventive concept, there is provided a storage system removably connected to a host, the storage system including: a data storage device configured to store a plurality of files; a host interface configured to receive, from the host, a pattern matching request including pattern information and file information regarding the plurality of files, and transmit, to the host, a result of pattern matching regarding the plurality of files; and a pattern matching accelerator configured to perform the pattern matching in response to the pattern matching request, wherein the pattern matching accelerator includes a plurality of scan engines configured to scan data based on a pattern, and a scheduler configured to dynamically assign at least some of the plurality of files to each of the plurality of scan engines as the data.

According to another aspect of the inventive concept, there is provided a method of operating a storage system removably connected to a host and including a data storage device configured to store a plurality of files, the method including: receiving, from the host, a pattern matching request including pattern information and file information regarding the plurality of files; performing pattern matching regarding the plurality of files in response to the pattern matching request; and transmitting, to the host, a result of the pattern matching, wherein the performing of the pattern matching includes: dynamically assigning at least some of the plurality of files to a plurality of scan engines; and scanning, via each of the plurality of scan engines, data included in an assigned file based on a pattern.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
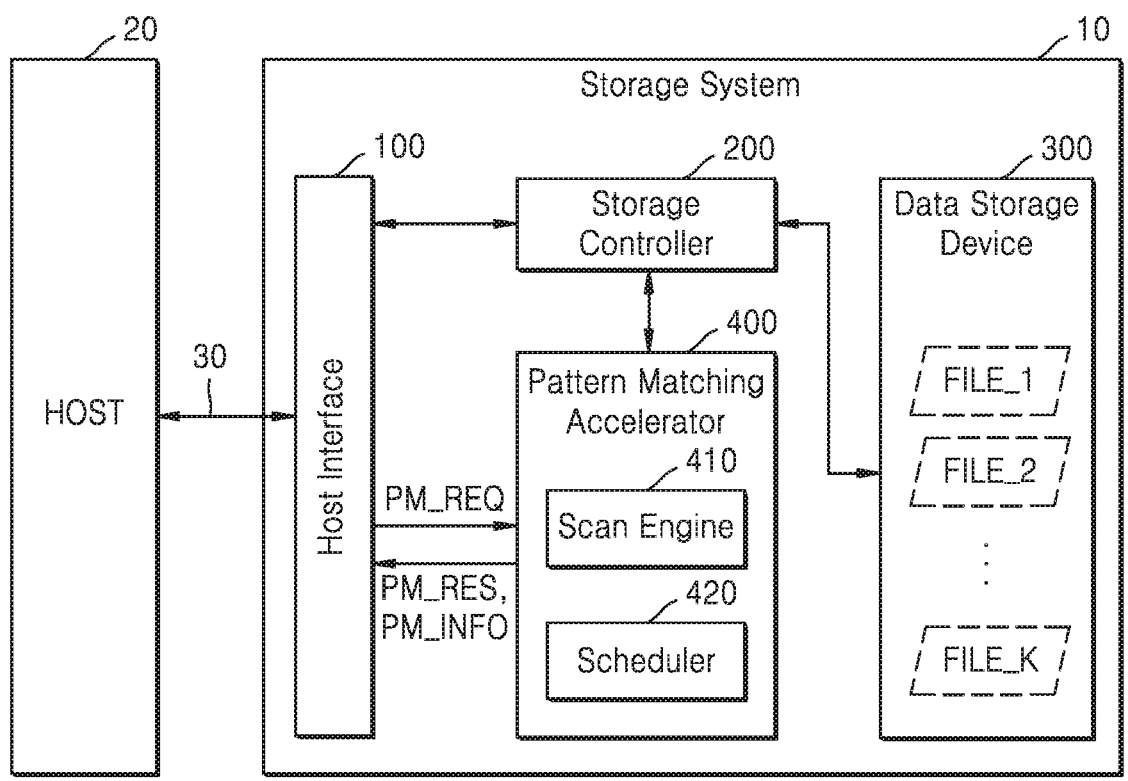
FIG. 1 is a block diagram illustrating a storage system for communicating with a host, according to an example embodiment of the present disclosure.

FIG. 1 is a block diagram illustrating a storage system 10 for communicating with a host 20 according to an example embodiment of the present disclosure. As will be described below, the storage system 10 may perform, in response to a request (for example, a pattern matching request) of the host 20, a pattern matching with respect to data stored in the storage system 10.

The storage system 10 and the host 20 may configure a data processing system. For example, the storage system 10 and the host 20 may configure a stationary data processing system such as a desktop computer, a workstation, a data center, an Internet data center, an enterprise-specific data storage system, a storage area network (SAN), or a network attached storage (NAS), or may configure a mobile data processing system such as a laptop computer, a cellular phone, or a smartphone.

An interface 30 with which the storage system 10 and the host 20 communicate each other may use an electrical signal and/or an optical signal. The interface may be a serial advanced technology attachment (SATA) interface, a SATA express (SATAe) interface, a serial attached small computer system interface (serial attached SCSI; SAS), a peripheral component interconnect express (PCIe) interface, a non-volatile memory Express (NVMe) interface, an advanced host controller interface (AHCI), or a combination thereof.

The storage system 10 may be connected with the host 20 for data communication while the data storage system may be removed from the host to be connected to another host. As non-limiting examples, the storage system 10 may include a semiconductor memory device such as a solid-state drive or solid-state disk (SSD), an embedded SSD (eSSD), a universal flash storage (UFS), a multimedia card (MMC), or an embedded MMC (eMMC), or may include a storage medium, such as a hard disk drive (HDD) or a magnetic tape, different from the semiconductor memory device. As illustrated in FIG. 1, the storage system 10 may include a host interface 100, a storage controller 200, a data storage device 300, and a pattern matching accelerator 400.

The host interface 100 may receive a request from the host 20 via the interface 30. For example, the host interface 100 may receive a write request and data from the host 20 via the interface 30, and may transmit the received write request to the storage controller 200. Also, as illustrated in FIG. 1, the host interface 100 may receive a pattern matching request PM_REQ from the host 20 via the interface 30, and may transmit the received pattern matching request PM_REQ to the pattern matching accelerator 400. As will be described below with reference to FIGS. 2A to 2C, the pattern matching request PM_REQ may include information required to perform pattern matching.

The host interface 100 may provide a response for the request from the host 20 via the interface 30. For example, the host interface 100 may transmit corresponding data read from the storage system in response to a read request. Likewise, the host interface 100 may transmit a pattern matching result PM_RES and pattern matching information PM_INFO prepared by the pattern matching accelerator 400 via the interface 30 to the host 20. As will be described below with reference to FIGS. 3 and 4, the pattern matching result PM_RES may include information regarding data having a matched pattern, and the pattern matching information PM_INFO may include information regarding a pattern matching operation.

The storage controller 200 may process an access request received from the host 20 by managing data stored in the data storage device 300. For example, the storage controller 200 may write, in response to a write request of the host 20 received via the host interface 100, data into the storage device 300, or may read, in response to a read request of the host 20 received via the host interface 100, data stored in the data storage device 300 and transmit the data to the host 20 via the host interface 100. In some embodiments, an address that the host 20 provides to the storage system 10 may not have same format with an address stored in the data storage device 300, and the address provided by the host 20 may be converted by the data storage device 300.

The data storage device 300 may be controlled by the storage controller 20, and may store a plurality of files FILE_1 to FILE_K. A file is a data unit which is managed by the host 20 at a time, and the storage controller 200 may provide, in response to a read request of the host 20, at least some of the files stored in the data storage device 300 to the host 20. As described above, the data storage device 300 may include a semiconductor memory device, or may include a storage medium different from the semiconductor memory device.

The pattern matching accelerator 400 may perform, in response to the pattern matching request PM_REQ from the host 20. The pattern matching may be performed on the data stored in the data storage device 300, for example, at least some of the plurality of files FILE_1 to FILE_K may be involved in the pattern matching procedure. The pattern matching accelerator 400 may provide the pattern matching result PM_RES and/or the pattern matching information PM_INFO to the host 20. As illustrated in FIG. 1, the pattern matching accelerator 400 may access data, for example, at least some of the plurality of files FILE_1 to FILE_K, stored in the data storage device 300 by communicating with the storage controller 200. The pattern matching accelerator 400 may include a hardware block designed through logic synthesis, or may include a software block which is implemented by a processor, etc. As illustrated in FIG. 1, the pattern matching accelerator 400 may include a scan engine 410 and a scheduler 420.

The scan engine 410 may determine, by scanning data based on a pattern, a location of the data matching the pattern. In some embodiments, the scan engine 410 may include hardware capable of executing deterministic finite automation (DFA), and may receive a state transition rule table (STRT) as pattern information. The scan engine 410 may transit received data from states defined by the STRT by sequentially scanning data into bytes based on the STRT, and may provide, when reaching a state indicating pattern matching, information regarding the reached state. However, the scan engine 410 is not limited to the above structure, and may have any structure for performing pattern matching by scanning data.

The scheduler 420 may increase efficiency of the scan engine 410 by scheduling an operation which is performed by the scan engine 410. As will be described below with reference to FIGS. 2A to 2C, the pattern matching request PM_REQ provided by the host 20 may include information regarding a plurality of files as an object for searching a pattern. While respective pattern matching operations regarding the plurality of files may be performed independently from each other, a pattern matching operation regarding each of the files may stop for various reasons because pattern matching requires an operation of sequentially scanning data. The various reasons may include read failure from the data storage device 300, delay in reading, delay in storing a scan result, or error occurrence during an data scanning operation. The pattern matching operation may be sustained while the reason for stopping the scan operation is not removed, and thus, efficiency of the pattern matching operation may decrease.

The scheduler 420 may control the scan engine 410 to stop scanning one of a plurality of files and start scanning another from among the plurality of files. According to example embodiments, the scheduler 420 may start scanning operation by assigning a certain file to the scan engine 410. The scheduler 420 may stop for the scan engine to scan a first file FILE_1, and to start a scan operation regarding a second file FILE_2 instead. When an event of stopping a scan operation of the scan engine 410 occurs, the scheduler 420 may increase efficiency of the scan engine 410 by stopping a scan operation regarding a file assigned to the scan engine 410 currently and starting a scan operation regarding another file, and as a result, efficiency of a pattern matching operation may increase.

Figure 2A:
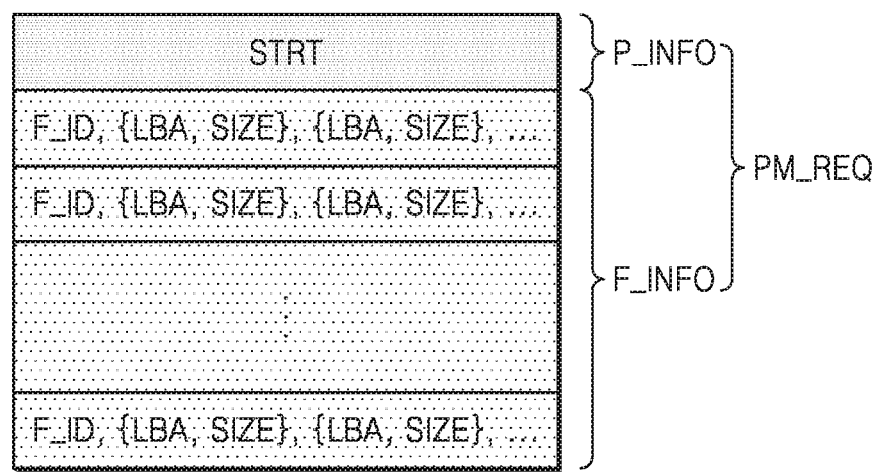
FIGS. 2A to 2C are diagrams illustrating examples of a pattern matching request of FIG. 1, according to example embodiments of the present disclosure.
Figure 2B:
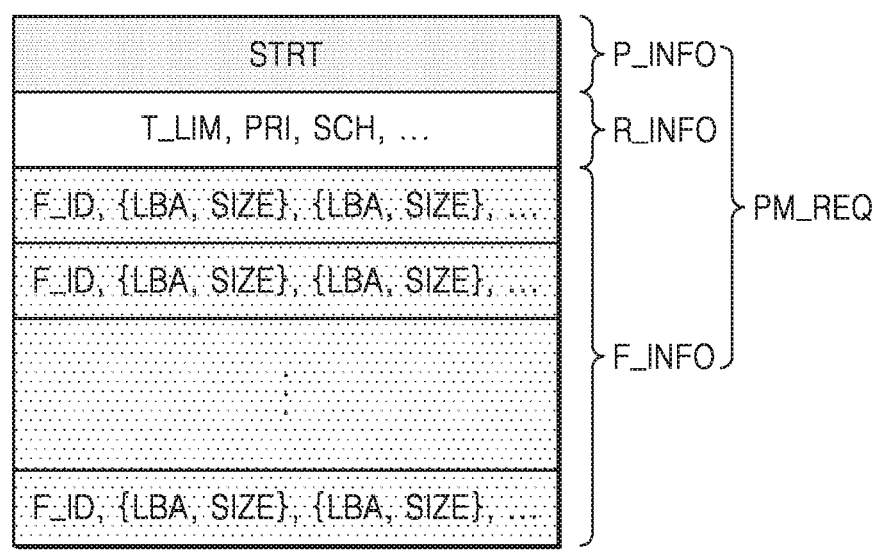
Figure 2C:
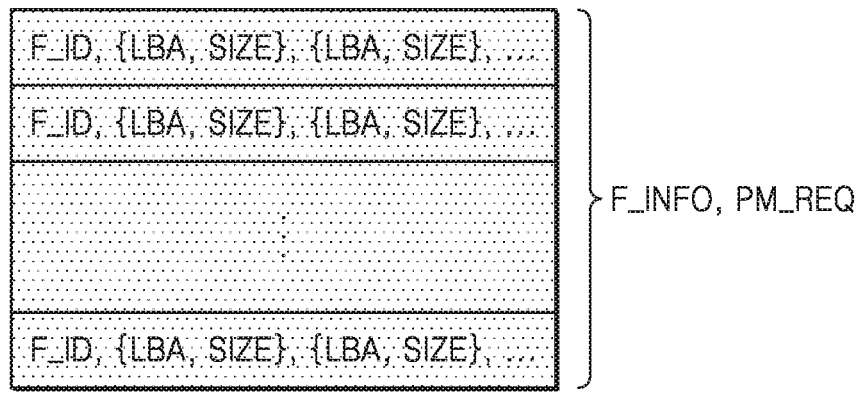

FIGS. 2A to 2C are diagrams illustrating examples of the pattern matching request PM_REQ of FIG. 1. The host 20 may transmit the pattern matching request PM_REQ to the storage system 10 via the interface 30, and the pattern matching accelerator 400 may receive the pattern matching request PM_REQ via the host interface 100. In some embodiments, the pattern matching request PM_REQ may be a newly added command among command sets that are supported by the interface 30 of FIG. 1. For example, the interface may be SATA, SAS, or NVMe.

Referring to FIG. 2A, the pattern matching request PM_REQ may include pattern information P_INFO. The pattern information P_INFO may define a pattern required to perform pattern matching. For example, as illustrated in FIG. 2A, the pattern information P_INFO may include a STRT. As described above with reference to FIG. 1, the scan engine 410 may include hardware capable of executing DFA, and may sequentially scan data in bytes based on the STRT as the pattern information. However, the pattern information P_INFO illustrated in FIGS. 2A and 2B is merely an example. In some embodiments, the pattern information P_INFO may include data of a different type than the STRT.

The pattern matching request PM_REQ may also include file information F_INFO The file information F_INFO may define at least one data unit that is an object of pattern matching. For example, as illustrated in FIG. 2A, the file information F_INFO may include pieces of information regarding at least one file, and information regarding one file may include a file identifier F_ID and at least one pair {LBA, SIZE} of address information LBA and size information SIZE. The file identifier F_ID may be used to identify a file which includes the address information LBA and the size information SIZE. For example, the scheduler 420 may recognize characteristics information of data through the file identifiers and being able to process each file independently from each other based on the information by controlling the scan engine 410 accordingly. Data stored in the data storage device 300 may be defined by a pair {LBA, SIZE} of the address information LBA and the size information SIZE. In some embodiments, pairs {LBA, SIZE} of the address information LBA and the size information SIZE corresponding to one file may be arranged in an order in which pattern matching (or scanning) is to be performed, and the scheduler 420 may control the scan engine 410 to perform a scan operation according to the order of the pairs {LBA, SIZE} of the address information LBA and the size information SIZE. Defining data based on a pair {LBA, SIZE} of the address information LBA and the size information SIZE as illustrated in FIG. 2A is merely an example, and for example, the file information F_INFO may include a pair of start address information and end address information.

Referring to FIG. 2B, the pattern matching request PM_REQ may include requirement information R_INFO. The requirement information R_INFO may include at least one requirement from the host 20 regarding the pattern matching performed in the storage system 10. For example, as illustrated in FIG. 2B, the requirement information R_INFO may include a time requirement T_LIM, which is a time required to complete a pattern matching operation that is performed in the storage system 10. The requirement information R_INFO may further include an order of priority PRI indicating an order of priority of the pattern matching requests PM_REQs, and may also include a scheme requirement SCH for determining a pattern matching method.

Referring to FIG. 2C, the pattern matching request PM_REQ may not include the pattern information P_INFO and/or may not include the requirement information R_INFO, either. In other words, after the pattern matching request PM_REQ is transmitted to the storage system 10, the host 20 may independently transmit the file information F_INFO to the storage system 10. For example, the host 20 may allow the storage system 10 to start a pattern matching operation by transmitting the pattern matching request PM_REQ including the pattern information P_INFO to the storage system 10 and then may additionally transmit the file information F_INFO referring to different data each time to the storage system 10 at least once. After receiving the pattern matching request PM_REQ, the storage system 10 may continue a pattern matching operation based on the pattern information P_INFO included in the pattern matching request PM_REQ received initially and the file information F_INFO received subsequently.

Figure 3:
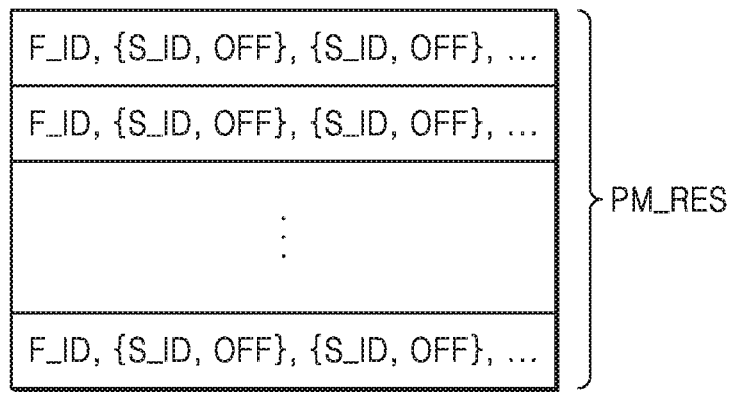
FIG. 3 is a diagram illustrating an example of a pattern matching result of FIG. 1, according to an example embodiment of the present disclosure.

FIG. 3 is a diagram illustrating an example of the pattern matching result PM_RES of FIG. 1. The pattern matching accelerator 400 may provide the pattern matching result PM_RES to the host 20 via the host interface 100. The pattern matching result may indicate whether the data include a matched pattern.

Referring to FIG. 3, the pattern matching result PM_RES may include information regarding at least one data unit. For example, as illustrated in FIG. 3, the pattern matching result PM_RES may include the file identifier F_ID and at least one pair {S_ID, OFF} of a state identifier S_ID and an offset OFF as the information regarding at least one data unit. The file identifier F_ID may indicate a file in which data having a pattern to be found. The scan engine 410 may scan data according to the pattern information P_INFO (for example, an STRT) included in the pattern matching request PM_REQ, and the state identifier S_ID may indicate a state in which a matched pattern is found. The offset OFF may indicate a location in data where a pattern is found. The pattern matching result PM_RES illustrated in FIG. 3 is merely an example, and unlike one illustrated in FIG. 3, the pattern matching result PM_RES may include information indicating a location of data having a pattern found.

Figure 4:
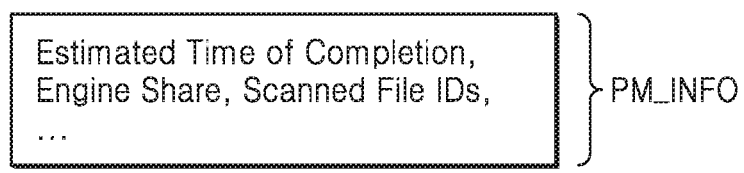
FIG. 4 is a diagram illustrating an example of pattern matching information of FIG. 1, according to an example embodiment of the present disclosure.

FIG. 4 is a diagram illustrating an example of the pattern matching information PM_INFO of FIG. 1. The pattern matching accelerator 400 may provide the pattern matching information PM_INFO to the host 20 via the host interface 100.

Referring to FIG. 4, the pattern matching information PM_INFO may be generated in the pattern matching accelerator 400 (for example, the scheduler 420) as a result of performing the pattern matching. The pattern matching information PM_INFO may include information regarding pattern matching operations. For example, the pattern matching information PM_INFO may include a time estimated for completion of pattern matching, information for a scan engine in which the pattern matching is performed, and information regarding scanned files. The pattern matching accelerator 400 may provide the pattern matching information PM_INFO to the host 20 in response to a request of the host 20 for the pattern matching information PM_INFO, may provide the pattern matching information PM_INFO to the host 20 when it is determined that the requirement information R_INFO included in the pattern matching request PM_REQ of the host 20 is difficult to satisfy, or may provide the pattern matching information PM_INFO to the host 20 periodically during a process of performing pattern matching according to the pattern matching request PM_REQ. The information included in the pattern matching information PM_INFO illustrated in FIG. 4 is merely an example. The pattern matching information PM_INFO may include only one piece of information, or may further include information that is not illustrated in FIG. 4.

Figure 5:
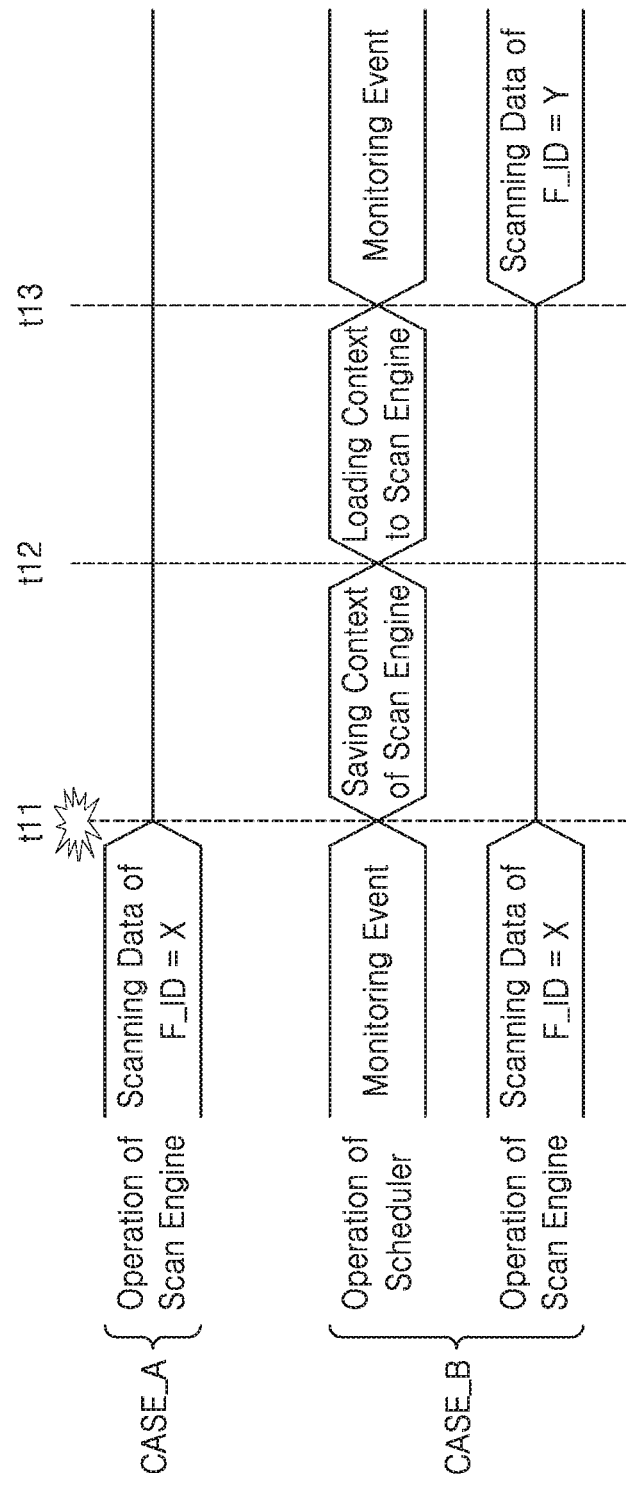
FIG. 5 is a diagram illustrating example operations of a pattern matching accelerator of FIG. 1 in chronological order, according to an example embodiment of the present disclosure.

FIG. 5 is a diagram illustrating example operations of the pattern matching accelerator 400 of FIG. 1 in chronological order. In a first case CASE_A, when an event of stopping a scan operation of the scan engine 410 occurs at a time t11, the scan engine 410 performs a scan operation regarding a plurality of files without control of the scheduler 420, and, in a second case CASE_B, the scan engine 410 performs a scan operation regarding a plurality of files under control of the scheduler 420. The scheduler 420 may increase utilization of the scan engine 410 by scheduling an operation which is performed by the scan engine 410.

Referring to the 'CASE_A' of FIG. 5, the scan engine 410 may stop an operation of scanning data of 'F_ID=X' at the time t11 when an event that causes stopping of the scanning operation occurs. As long as the event that has caused the stopping of the scanning operation at the time t11 is not solved, the scan operation by the scan engine 410 may not restart, and as a result, the scan engine 410 becomes idle and thus efficiency of a pattern matching operation may decrease.

Referring to the 'CASE_B' of FIG. 5, the scheduler 420 may monitor an event that causes a scan operation of the scan engine 410 to stop. Accordingly, the scheduler 420 may recognize that the event has occurred at the time t11. After the scan engine 410 stopping the operation of scanning data in which data identifier indicates 'F_ID=X', the scheduler 420 may store a context of the scan engine 410. The context of the scan engine 410 may indicate the state of the scan engine at the time t11 where the scan engine becomes idle. For example, the scheduler 420 may include registers capable of storing a plurality of contexts of the scan engine 410, and may store a context of the scan engine 410 at the time t11 in one of the registers to resume later the operation of scanning data stopped at the time t11.

At a time t12, the scheduler 420 may complete storing the context of the scan engine 410, and may load another context to the scan engine 410. The context that is loaded to the scan engine 410 at the time t12 may he used for the scan engine 410 to start scanning data of 'F_ID=Y'. The scanning data of 'F_ID=Y' may indicate the data with which the scan engine restarts scanning operation. For example, the scheduler 420 may access a register, from among the registers for storing a plurality of contexts, that stores a context of the scan engine 410 in times of an operation of scanning data of 'F_ID=Y', and may read the context from the register and load the context to the scan engine 410.

At a time t13, the scheduler 420 may complete loading of the context to the scan engine 410, and may control the scan engine 410 to start the operation of scanning data of 'F_ID=Y'. Accordingly, while the scan engine 410 may start the operation of scanning data of 'F_ID=Y', the scheduler 420 may monitor again an event that may cause a scan operation of the scan engine 410 to stop. As a result, in the 'CASE_B', the scan engine 410 may start the operation of scanning data of 'F_ID=Y' in spite of the occurrence of an event at the time t11 which has stopped the operation of scanning data of 'F_ID=X', and compared to the 'CASE_A', efficiency of the scan engine 410 and efficiency of a resulting pattern matching operation may increase. Although example embodiments of the present disclosure will be described hereinafter by citing, for convenience of description, an example in which, as illustrated in FIG. 5, the scan engine 410 stops an operation of scanning data of 'F_ID=Y' due to the occurrence of an event and starts an operation of scanning data of 'F_ID=Y'.

Figure 6:
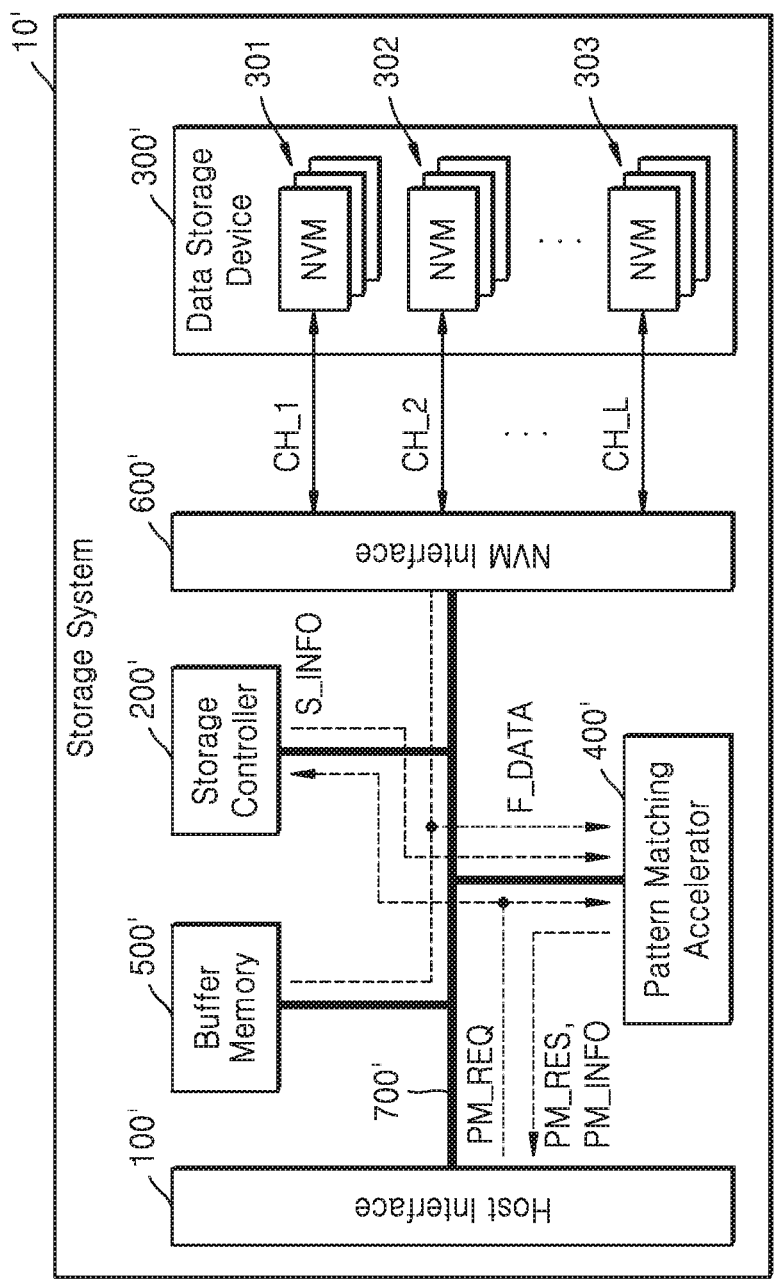
FIG. 6 is a block diagram illustrating an example structure of the storage system of FIG. 1, according to an example embodiment of the present disclosure.

FIG. 6 is a block diagram illustrating an example structure of the storage system 10 of FIG. 1. A storage system 10' of FIG. 6 may communicate with the host 20, and a pattern matching accelerator 400' of FIG. 6 may provide the pattern matching result PM_RES and/or the pattern matching information PM_INFO to the host 20 by performing pattern matching in response to the pattern matching request PM_REQ from the host 20.

In the example of FIG. 6, the storage system 10' may include a semiconductor memory device that stores data. As illustrated in FIG. 6, the storage system 10' may include a host interface 100', a storage controller 200', a data storage device 300', the pattern matching accelerator 400', a buffer memory 500', an NVM interface 600', and a bus 700', and the host interface 100', the storage controller 200', the pattern matching accelerator 400', the buffer memory 500', and the NVM interface 600' may communicate with one another via the bus 700'.

The data storage device 300' may include a plurality of NVMs. An NVM may refer to a memory that does not lose stored data even when power supply is blocked, and the data storage device 300' may include, for example, an electrically erasable programmable read-only memory (EEPROM), a flash memory, a phase-change random access memory (PRAM), a resistance random access memory (PRAM), a nano floating gate memory (NFGM), a polymer random access memory (PoRAM), a magnetic random access memory (MRAM), a ferroelectric random access memory (FRAM), etc., as the NVM.

The NVM interface 600' and the data storage device 300' may communicate with each other via a plurality of channels CH_1 to CH_L. For example, a first group 301 of the NVM included in the data storage device 300' may communicate with the NVM interface 600' via a first channel CH_1, a second group 302 of the NVM may communicate with the NVM interface 600' via a second channel CH_2, and a third group 303 of the NVM may communicate with the NVM interface 600' via a $L^{th}$ channel CH_L. The first to third groups 301 to 303 of the NVM may communicate with the NVM interface 600' independently from each other. For example, the NVMs included in different channels may perform read or write operation in parallel.

The storage controller 200' may process an access request of the host 20 of FIG. 1 regarding the data storage device 300', for example, a data read request, a data write request, etc., by managing the data storage device 300'. For example, the storage controller 200' may include an address mapping table, and may convert an address that is received from the host 20 via the host interface 100', that is, a logical address, into an address that is used to access the data storage device 300', that is, a physical address, by referring to the address mapping table. In some embodiments, as illustrated in FIG. 6, the storage controller 200' may receive the pattern matching request PM_REQ via the host interface 100', may extract a logical address from the file information F_INFO included in the pattern matching request PM_REQ, and may convert the logical address into a physical address. Also, the storage controller 200' may perform operations, such as error correction, garbage collection, and reprogramming operation. In some embodiments, the storage controller 200' may provide a flash translation layer (FTL) between the host 20 and the data storage device 300'.

As the storage controller 200' manages the data storage device 300', information regarding the data storage device 300', that is, the NVMs, may be generated. As illustrated in FIG. 6, the storage controller 200' may provide information regarding the data storage device 300' to the pattern matching accelerator 400' as storage information S_INFO via the bus 700', and the pattern matching accelerator 400' may perform pattern matching based on the storage information S_INFO. For example, as described above with reference to FIG. 1, the pattern matching accelerator 400' may include a scheduler and a scan engine, and the scheduler may control the scan engine based on the storage information S_INFO provided from the storage controller 200'. An operation in which the pattern matching accelerator 400' performs pattern matching based on the storage information S_INFO will be described below with reference to FIGS. 8A to 8D.

The buffer memory 500' may temporarily store data received via the bus 700', and may provide the stored data to other elements of the storage system 10'. For example, the buffer memory 500' may store data received from the host 20 via the host interface 100', or may store data read from the data storage device 300'.

In some embodiments, as illustrated in FIG. 6, the buffer memory 500' may provide file data F_DATA to the pattern matching accelerator 400', and the pattern matching accelerator 400' may perform pattern matching by scanning the file data F_DATA. The file data F_DATA may be data that is read from the data storage device 300' by the storage controller 200' or by the pattern matching accelerator 400' based on file information (for example, F_INFO of FIG. 2A) included in the pattern matching request PM_REQ and is stored in the buffer memory 500'. For example, the file data F_DATA may be a page unit of the NVM included in the data storage device 300'. The pattern matching accelerator 400' may obtain the file data F_DATA by accessing the buffer memory 500'. In some embodiments, as illustrated in FIG. 6, the pattern matching accelerator 400' may directly read the file data F_DATA from the data storage device 300' via the NVM interface 600'. The file data F_DATA received in the pattern matching accelerator 400' may be stored in inner storage space of the pattern matching accelerator 400'.

In some embodiments, the pattern matching accelerator 400' may support a plurality of pattern matching methods. For example, the pattern matching accelerator 400' may perform pattern matching by selecting one of the plurality of pattern matching methods based on a tendency for receiving the file data F_DATA, or as described above with reference to FIG. 2B, may perform pattern matching by selecting one of the plurality of pattern matching methods based on a scheme requirement included in the requirement information R_INFO of the pattern matching request PM_REQ.

Figure 7:
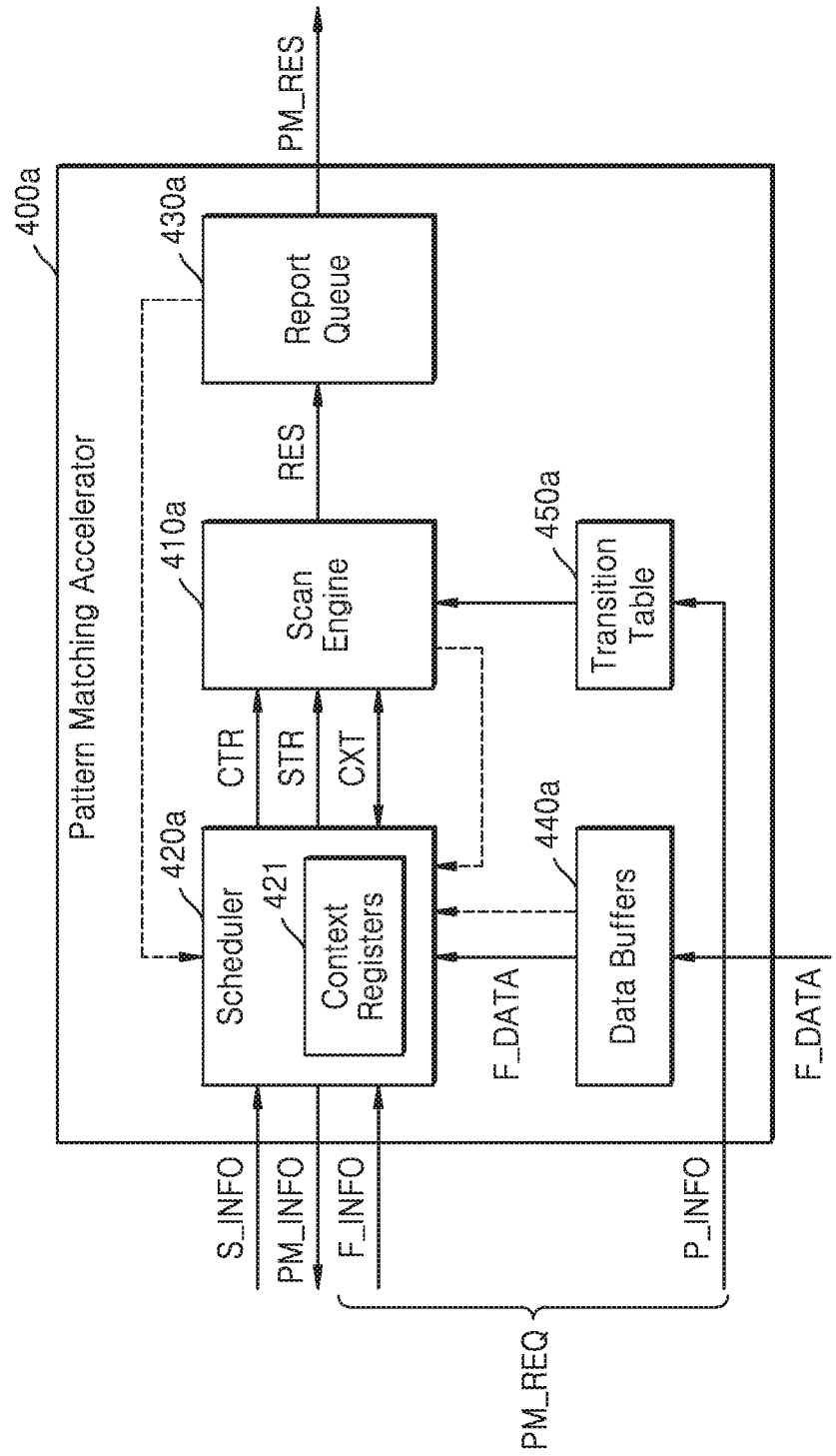
FIG. 7 is a block diagram illustrating an example structure of a pattern matching accelerator of FIG. 6, according to an example embodiment of the present disclosure.

FIG. 7 is a block diagram illustrating an example structure of the pattern matching accelerator 400' of FIG. 6. As described above with reference to FIG. 6, a pattern matching accelerator 400a of FIG. 7 may receive the pattern matching information PM_INFO, the storage information S_INFO, and the file data F_DATA, and may output the pattern matching result PM_RES and the pattern matching information PM_INFO. As illustrated in FIG. 7, the pattern matching accelerator 400a may include a scan engine 410a, a scheduler 420a, a report queue 430a, data buffers 440a, and a transition table 450a. FIG. 7 will be described hereinafter with reference to FIG. 6.

The data buffers 440a may collect and store the file data F_DATA corresponding to at least one file. That is, the data buffers 440a may store the file data F_DATA corresponding to at least some of the file identifiers included in the file information F_INFO. Accordingly, when a new file is assigned to the scan engine 410a by the scheduler 420a, the file data F_DATA that corresponds to the assigned file may be provided from the data butlers 440a to the scheduler 420a, and the file data F_DATA that corresponds to a previously assigned file may be retained in the data buffers 440a.

The scheduler 420a may receive the storage information S_INFO and the file information F_INFO, and may receive the file data F_DATA from the data buffers 440a. The scheduler 420a may assign a file to the scan engine 410a based on the storage information S_INFO and the file information F_INFO. For example, the scheduler 420a may generate a control signal CTR for controlling an operation of the scan engine 410a (for example, stopping, starting, etc. of a scan operation) based on the storage information S_INFO and the file information F_INFO, may obtain the file data F_DATA that corresponds to an assigned file from the data buffers 440a, and may generate a data stream STR (for example, in bytes) from the obtained file data F_DATA and provide the data stream STR to the scan engine 410a. Also, the scheduler 420a may generate the pattern matching information PM_INFO based on at least one of the storage information S_INFO, the file information F_INFO, the file data F_DATA, and a context signal CXT that is received from the scan engine 410a, and output the pattern matching information PM_INFO.

As denoted by dashed lines in FIG. 7, the scheduler 420a may receive signals from other elements of the pattern matching accelerator 400a, that is, the scan engine 410a, the report queue 430a, and the data buffers 440a, and may monitor an event occurring in the scan engine 410a, the report queue 430a, and the data buffers 440a. By monitoring the event, the scheduler 420a may assign a file different from a currently assigned file to the scan engine 410a when an event occurs. Examples of an operation in which the scheduler 420a assigns a new file to the scan engine 410a will be described below with reference to FIGS. 8A to 8D.

As illustrated in FIG. 7, the scheduler 420a may include context registers 421. The scheduler 420a may store a context of the scan engine 410a in one of the context registers 421 based on the context signal CXT that is received from the scan engine 410a, or may provide the context signal CXT to the scan engine 4110a based on a context stored in one of the context registers 421. For example, when the scheduler 420a stops a scan operation regarding a file assigned to the scan engine 410a, the scheduler 420a may store a context of the scan engine 410a in one of the context registers 421 based on the context signal CXT that is received from the scan engine 410a. Also, when the scheduler 420a assigns a new file to the scan engine 410a, the scheduler 420a may load a new context to the scan engine 410a by generating the context signal CXT from a context stored in a register, from among the context registers 421, that stores the context corresponding to a file to be assigned, and providing the context signal CXT to the scan engine 410*a*.

The scan engine 410*a* may process the data stream STR received from the scheduler 420*a* by referring to the transition table 450*a* and thus may perform an operation of scanning the file data F_DATA. For example, as described above with reference to FIG. 2A, etc., the pattern information P_INFO may include an STRT, and as illustrated in FIG. 7, the transition table 450*a* may store the pattern information P_INFO. The scan engine 410*a* may determine a state to be transitioned into based on the data stream STR by referring to the transition table 450*a*, and may transit into the determined state. When the scan engine 410*a* is transitioned into a state corresponding to pattern matching, the scan engine 410*a* may generate a result signal RES and provide the result signal RES to the report queue 430*a*. For example, the result signal RES may include information regarding a state of the scan engine 410*a*.

The report queue 430*a* may receive the result signal RES from the scan engine 410*a*, and may temporarily store a scan result based on the result signal RES. Also, the report queue 430*a* may receive, from the scan engine 410*a* or the scheduler 420*a*, file information and information regarding a location in data where a pattern is matched, and the result signal RES, the file information, and the information regarding a location in data where a pattern is matched may be generally referred to as a scan result. The report queue 430*a* may temporarily store the scan result, and may output the pattern matching result PM_RES including the scan result.

FIGS. 8A to 8D are flowcharts illustrating examples of an operation in which the scheduler 420*a* of FIG. 7 assigns a new file to the scan engine 410*a*. In detail, FIGS. 8A to 8D illustrate examples in which a scan operation regarding the file data F_DATA of 'F_ID=X', currently assigned to the scan engine 4110*a*, stops and a scan operation regarding the file data F_DATA of 'F_ID=Y' starts. FIGS. 8A to 8D will be described hereinafter with reference to FIG. 7.

Figure 8A:
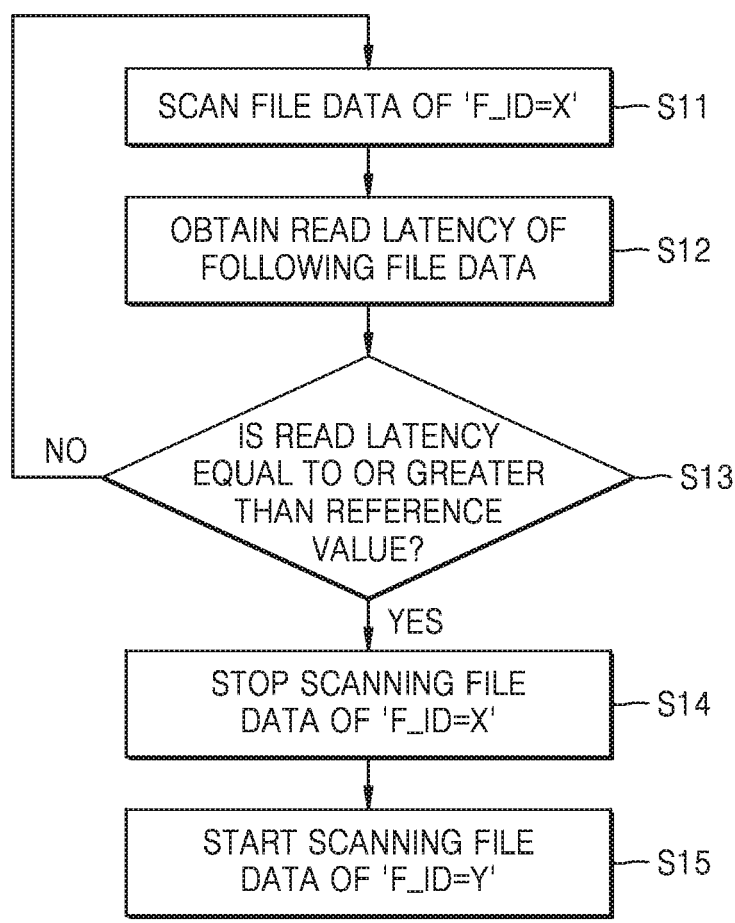
FIGS. 8A to 8D are flowcharts illustrating examples of an operation in which a scheduler of FIG. 7 assigns a new file to a scan engine, according to example embodiments of the present disclosure.

Referring to FIG. 8A, in operation S11, the scan engine 410*a* may scan the file data F_DATA of 'F_ID=X'. In operation S12, the scheduler 420*a* may obtain a read latency of the following file data F_DATA. The read latency may refer to a time required to read the file data F_DATA from the data storage device (for example, 300' of FIG. 6), and the storage information S_INFO provided from the storage controller (for example, 200' of FIG. 6) may include the read latency. The time required to read the file data F_DATA from the data storage device 300' may vary according to an operation that is performed by the storage controller 200' (for example, error correction, garbage collection, etc.) and/or a state of the NVM included in the data storage device 300' (for example, a write operation processing state according to a write request of a host).

In operation S13, the scheduler 420*a* may determine whether the read latency is equal to or greater than a reference value. When the read latency is less than the reference value, the scan engine 410*a* may continue the operation of scanning the file data F_DATA of 'F_ID=X' according to the operation S11 When the read latency is equal to or greater than the reference value, the scan engine 410*a* may stop, according to control of the scheduler 420*a*, scanning the file data F_DATA of 'F_ID=X' in operation S14 and then may start scanning the file data F_DATA of 'F_ID=Y' in operation S15. That is, when a read latency for at least a portion of the file data F_DATA of 'F_ID=X' which will be scanned subsequently by the scan engine 410*a* is great, a scan operation of the scan engine 410*a* may stop.

The scheduler 420*a* may determine, based on the read latency, that the operation of scanning the file data F_DATA of 'F_TD=X' will stop, and may assign, according to a determination result, another file, that is, a file in which 'F_ID=Y', to the scan engine 410*a*.

Figure 8B:
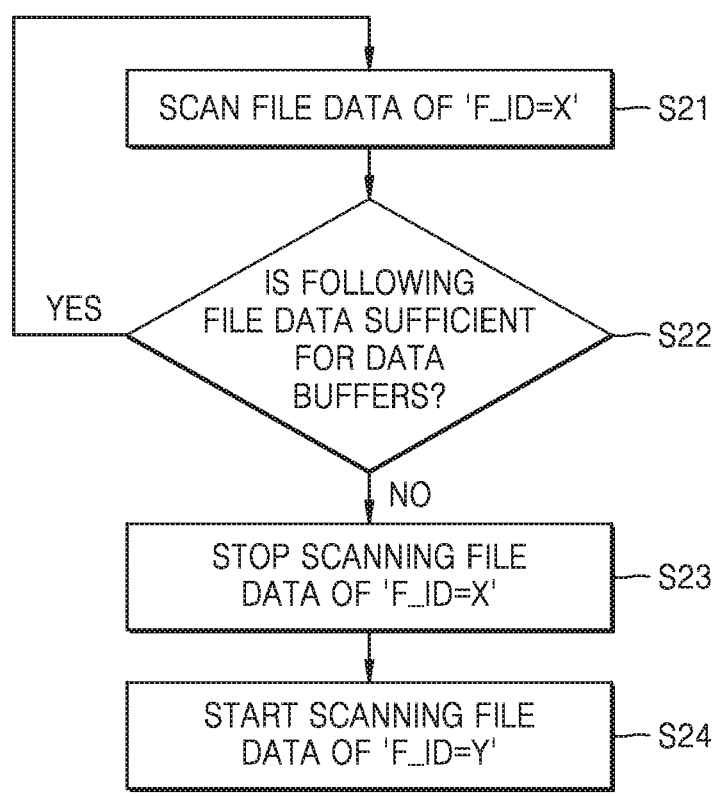

Referring to FIG. 8B, in operation S21, the scan engine 410*a* may scan the file data. F_DATA of '_ID=X'. In operation S22, the scheduler 420*a* may determine whether the following file data F_DATA is sufficient for the data buffers 440*a*. For example, the scheduler 420*a* may determine, based on a size of the file data F_DATA of 'F_ID=X' stored in the data buffers 440*a*, an offset of the data stream STR currently provided to the scan engine 410*a*, and a reference value, whether the following file data F_DATA is sufficient for the data buffers 440*a*, When the following file data F_DATA is sufficient, the scan engine 410*a* may continue the operation of scanning the file data F_DATA of 'F_ID=X' according to the operation S21. When the following file data F_DATA is not sufficient, the scan engine 410*a* may stop, according to control of the scheduler 420*a*, scanning the file data F_DATA of 'F_ID=X' in operation S23 and then may start scanning the file data F_DATA of 'F_ID=Y' in operation S24.

Figure 8C:
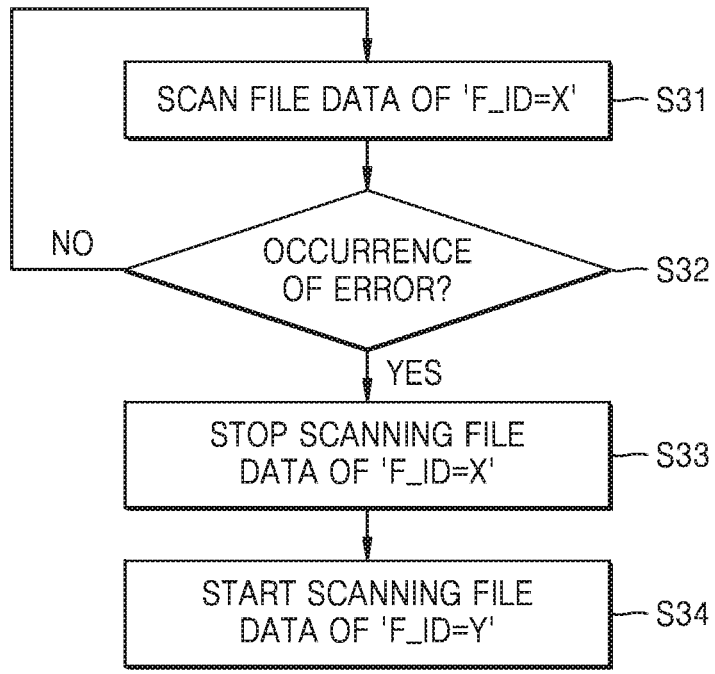

Referring to FIG. 8C, in operation S31, the scan engine 410*a* may scan the file data F_DATA of 'F_ID=X'. In operation S32, the scheduler 420*a* may determine whether an error has occurred in an operation of the scan engine 410*a*. As non-limiting examples, an error such as transition into a state that is not defined in the pattern information P_INFO stored in the transition table 450*a* referred to by the scan engine 410*a* or the occurrence of a transition condition that is not defined in the pattern information P_INFO may occur. When no error occurs, the scan engine 410*a* may continue the operation of scanning the file data F_DATA of 'F_ID=X' according to the operation S31. When an error occurs, the scan engine 410*a* may stop, according to control of the scheduler 420*a*, scanning the file data F_DATA of 'F_ID=X' in operation S33 and then may start scanning the file data F_DATA of 'F_ID=Y' in operation S34.

Figure 8D:
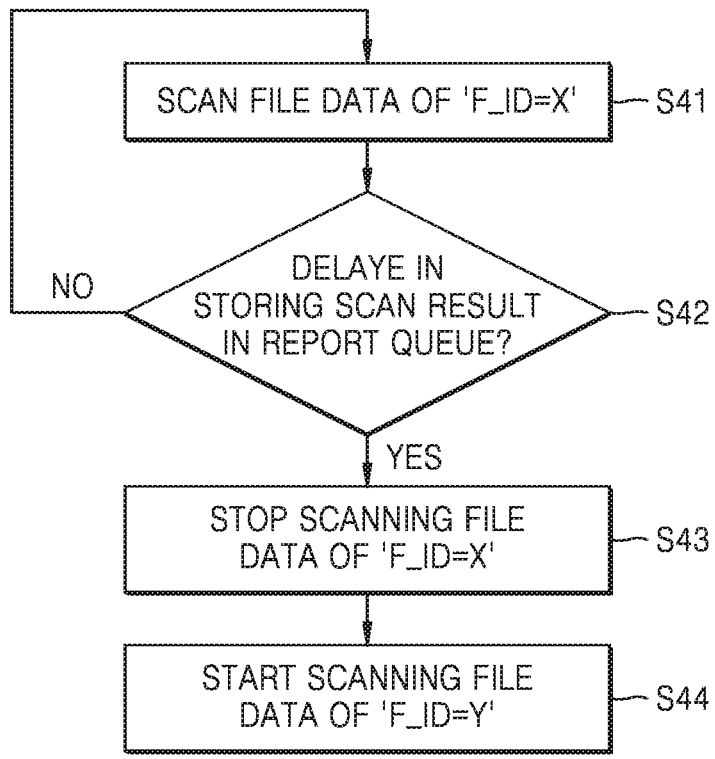

Referring to FIG. 8D, in operation S41, the scan engine 410*a* may scan the file data F_DATA of 'F_ID=X'. In operation S42, the scheduler 420*a* may determine whether storing a scan result in the report queue 430*a* is delayed. For example, the report queue 430*a* may have finite storage space, and a size of empty storage space in the report queue 430*a* may change according to a rate at which a scan result is stored in the report queue 430*a* according to the result signal RES output by the scan engine 410*a* and a rate at which the pattern matching result PM_RES is output. When there is no or little empty storage space in the report queue 430*a*, storing a scan result in the report queue 430*a* may be delayed, and a scan operation of the scan engine 410*a* may stop to prevent loss of scan results previously stored in the report queue 430*a*. Accordingly, the scheduler 420*a* may determine whether storing a scan result in the report queue 430*a* is delayed, and thus, when storing of the scan result in the report queue 430*a* is not delayed, the scan engine 410*a* may continue the operation of scanning the file data F_DATA of 'F_ID=X' according to the operation S41, whereas, when storing of the scan result in the report queue 430*a* is delayed, the scan engine 410*a* may stop, according to control of the scheduler 420*a*, scanning the file data F_DATA of 'F_ID=X' in operation S43 and then may start scanning the file data F_DATA of 'F_ID=Y' in operation S44. Thus, a scan operation regarding the file data F_DATA of 'F_ID=X' may be resumed later as a context thereof is stored, and the scan engine 410*a* may perform a scan operation regarding the file data F_DATA of 'F_ID=Y' until the report queue 430a has an empty storage space.

Operations of the scan engine 410a and the scheduler 420a described above with reference to FIGS. 8A to 8D are merely examples. That is, the scheduler 420a according to an example embodiment of the present disclosure may monitor various events causing a scan operation of the scan engine 410a to stop, and may assign a new file to the scan engine 410a when an event occurs.

Figure 9:
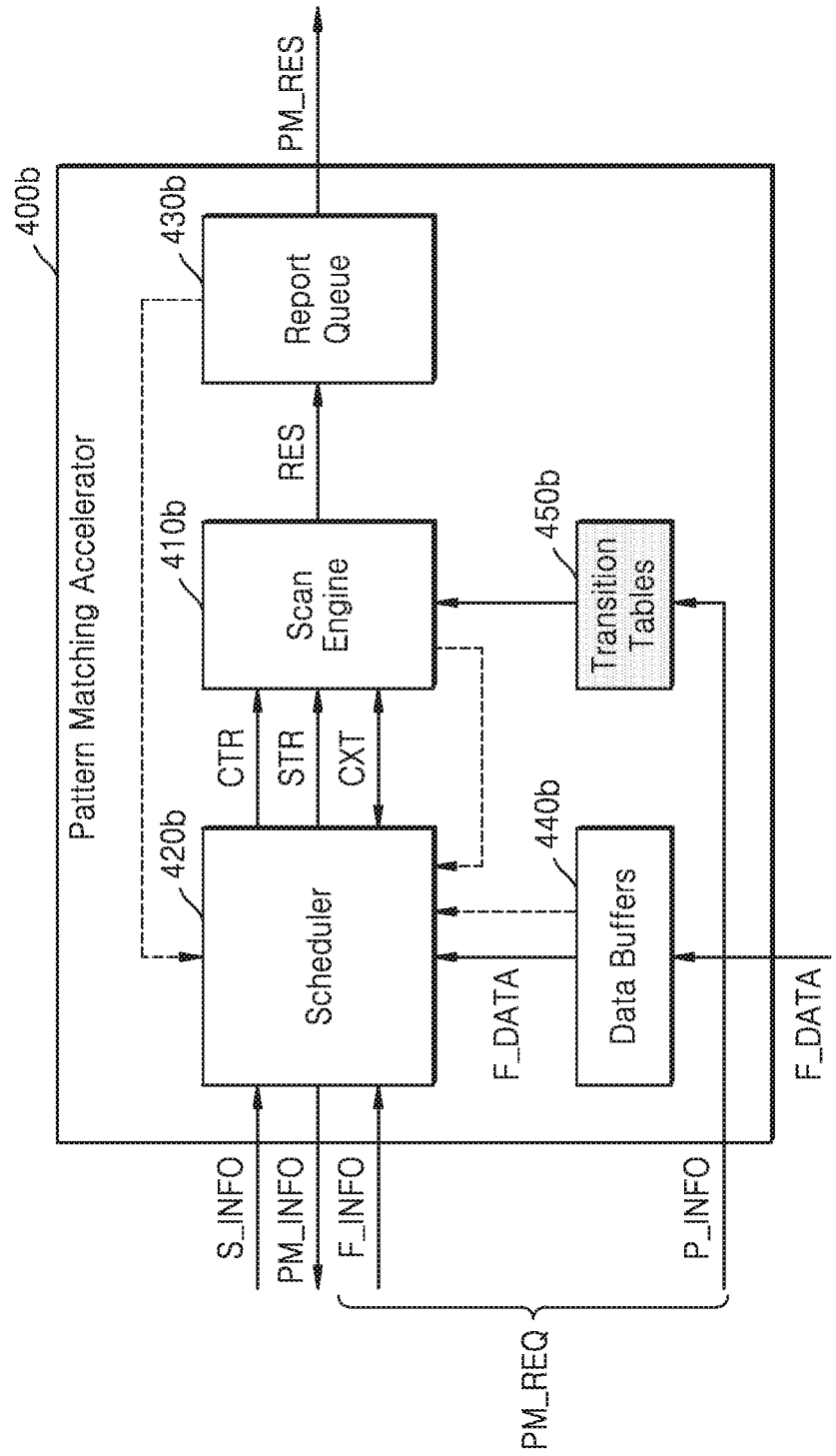
FIG. 9 is a block diagram illustrating an example structure of the pattern matching accelerator of FIG. 6, according to an example embodiment of the present disclosure.

FIG. 9 is a block diagram illustrating an example structure of the pattern matching accelerator 400' of FIG. 6 according to an example embodiment of the present disclosure. As illustrated in FIG. 9, a pattern matching accelerator 400b may include a scan engine 410b, a scheduler 420b, a report queue 430b, data buffers 440b, and transition tables 450b. Compared with the pattern matching accelerator 400a of FIG. 7, the pattern matching accelerator 400b of FIG. 9 may include the transition tables 450b for storing information regarding a plurality of patterns.

The transition tables 450b may collect and store the pattern information P_INFO that corresponds to a plurality of patterns. In some embodiments, the pattern matching request PM_REQ may include the pattern information P_INFO that includes a plurality of STRTs corresponding to a plurality of patterns, and the transition tables 450b may store the pattern information P_INFO corresponding to the plurality of patterns. In some embodiments, as described above with reference to FIG. 2A, the pattern matching request PM_REQ may include the pattern information P_INFO that includes an STRT corresponding to one pattern, and the transition tables 450b may collect the pattern information P_INFO that corresponds to plurality of patterns from a plurality of pattern matching requests PM_REQ provided from a host and store the pattern information P_INFO. Thus, a context of the scan engine 410b may include table information indicating one of the transition tables 450b and may be transmitted between the scheduler 420b and the scan engine 410b via the context signal CXT.

Figure 10:
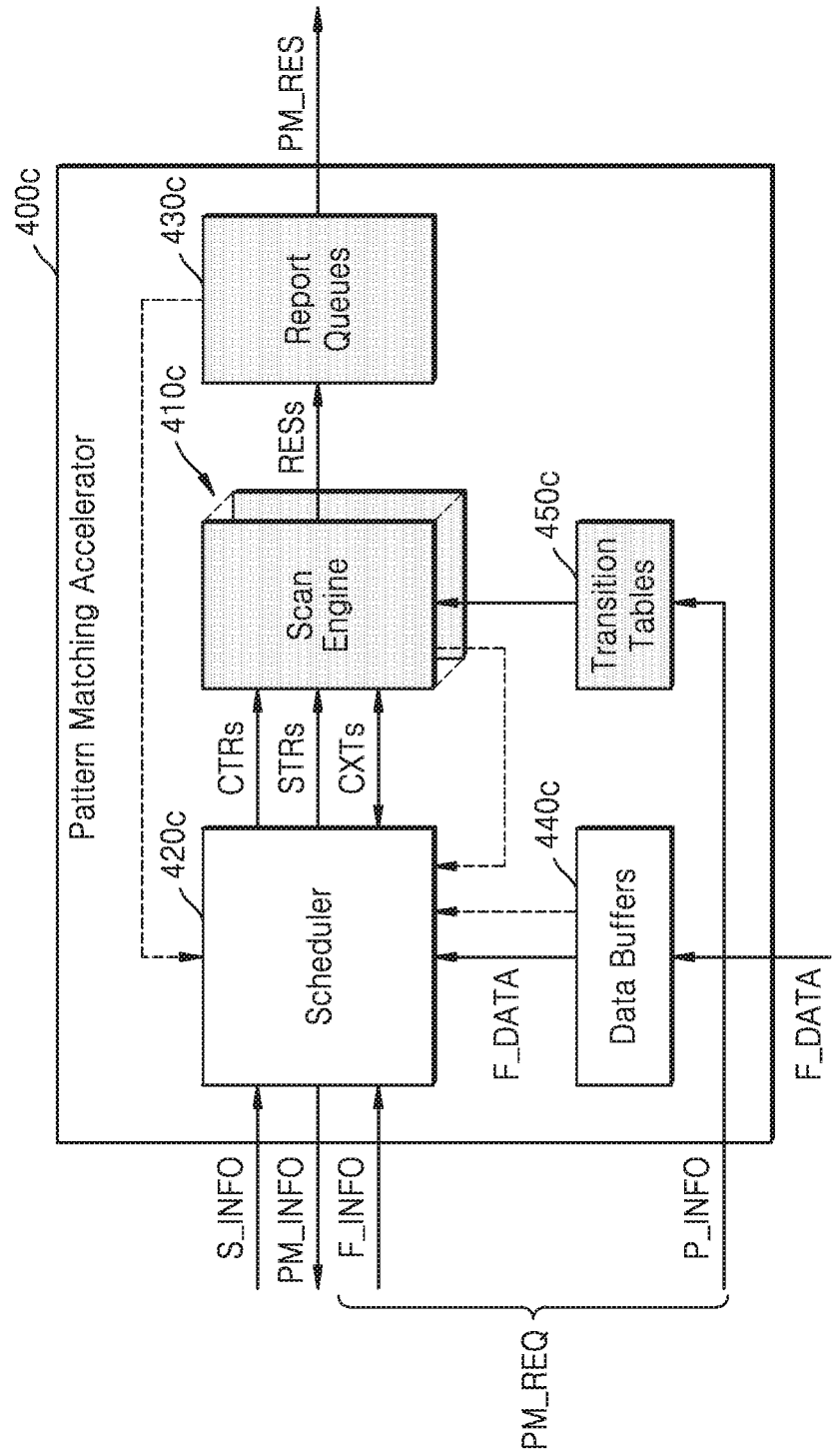
FIG. 10 is a block diagram illustrating an example structure of the pattern matching accelerator of FIG. 6, according to an example embodiment of the present disclosure.

FIG. 10 is a block diagram illustrating an example structure of the pattern matching accelerator 400' of FIG. 6 according to an example embodiment of the present disclosure. As illustrated in FIG. 10, a pattern matching accelerator 400c may include scan engines 410c, a scheduler 420c, report queues 430c, data buffers 440c, and transition tables 450c. Compared with the pattern matching accelerators 400a and 400b of FIGS. 7 and 9, the pattern matching accelerator 400c of FIG. 10 may include the scan engines 410c, and may include the transition tables 450c respectively referred to by the scan engines 410c, and the report queues 430c for storing scan signals RESs generated in parallel by the scan engines 410c. Also, the data buffers 440c may collect and store the file data F_DATA that corresponds to a plurality of files in order to provide the file data F_DATA to the scan engines 410c.

Referring to FIG. 10, the scheduler 420c may generate control signals CTRs and data streams STRs for the scan engines 410c, and may transmit and receive context signals CXTs to and from the scan engines 410c. An operation in which the scheduler 420c controls the scan engines 410c will be described below with reference to FIG. 11.

The pattern matching accelerator 400c may include the scan engines 410c, which may be controlled by the scheduler 420c to minimize a period during which a scan operation stops, and thus, efficiency of a pattern matching operation may increase. Each of the scan engines 410c may independently perform a scan operation regarding an assigned file, and may have a new file assigned by the scheduler 420c. The scheduler 420c may (for example, mutually exclusively) dynamically assign at least some of a plurality of files to each of the scan engines 410c by monitoring an event causing a scan operation of each of the scan engines 410c to stop. Thus, efficiency of a pattern matching operation may increase due to not only parallel scan operations by the scan engines 410c but also fast speed of each of the scan engines 410c.

Figure 11:
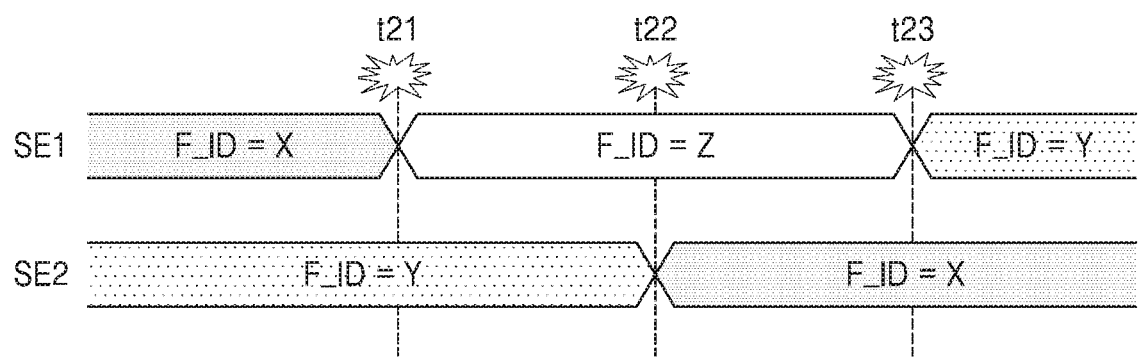
FIG. 11 is a diagram illustrating example operations of a plurality of scan engines of FIG. 10 in chronological order, according to an example embodiment of the present disclosure.

FIG. 11 is a diagram illustrating example operations of the scan engines 410c of FIG. 10 in chronological order according to an example embodiment of the present disclosure. In detail, FIG. 11 illustrates scan operations of two scan engines SE1 and SE2 regarding three files. Although FIG. 11 illustrates example operations of the two scan engines SET and SE2, scan operations of three or more scan engines may also be performed in a similar manner to that illustrated in FIG. 11, according to an example embodiment of the present disclosure. For convenience of description, periods during which contexts of the two scan engines SE1 and SE2 are stored and loaded are omitted in FIG. 11, and FIG. 11 will be described hereinafter with reference to FIG. 10.

Referring to FIG. 11, the first scan engine SE1 may perform a scan operation of the file data F_DATA of 'F_ID=X', and the second scan engine SE2 may perform a scan operation of the file data F_DATA of 'F_ID=Y'. That is, before a time t21, the scheduler 420c may assign a file in which 'F_ID=X' to the first scan engine SE1, and may assign a file in which 'F_ID=Y' to the second scan engine SE2.

At the time t21, an event causing the scan operation of the first scan engine SE1 to stop may occur. The scheduler 420c may stop the scan operation of the first scan engine SE1, and may assign a file in which 'F_ID=Z' to the first scan engine SE1. Thus, the first scan engine SE1 may perform a scan operation regarding the file data F_DATA of 'F_ID=Z' after the scan operation regarding the file data F_DATA of 'F_ID=X'.

At a time t22, an event causing the scan operation of the second scan engine SE2 to stop may occur. The scheduler 420c may stop the scan operation of the second scan engine SE2, and may assign a file in which 'F_ID=X' to the second scan engine SE2. Thus, the second scan engine SE2 may perform a scan operation regarding the file data F_DATA of 'F_ID=X'. That is, the scan operation regarding the file data F_DATA of 'F_ID=X', which is stopped at the time t21 by the first scan engine SE1, may be resumed at the time t22 by the second scan engine SE2.

At a time t23, an event causing the scan operation of the first scan engine SE1 to stop may occur. The scheduler 420c may stop the scan operation of the first scan engine SE1, and may assign a file in which 'F_ID=Y' to the first scan engine SE1. Thus, the first scan engine SE1 may perform a scan operation regarding the file data F_DATA of 'F_ID=Y'. That is, the scan operation regarding the file data F_DATA of 'F_ID=Y', which is stopped at the time t22 by the second scan engine SE2, may be resumed at the time t23 by the first scan engine SE1. Thus, as illustrated in FIG. 11, the first and second scan engines SE1 and SE2 may be allowed by the scheduler 420c to substantially continuously perform a scan operation.

Figure 12:
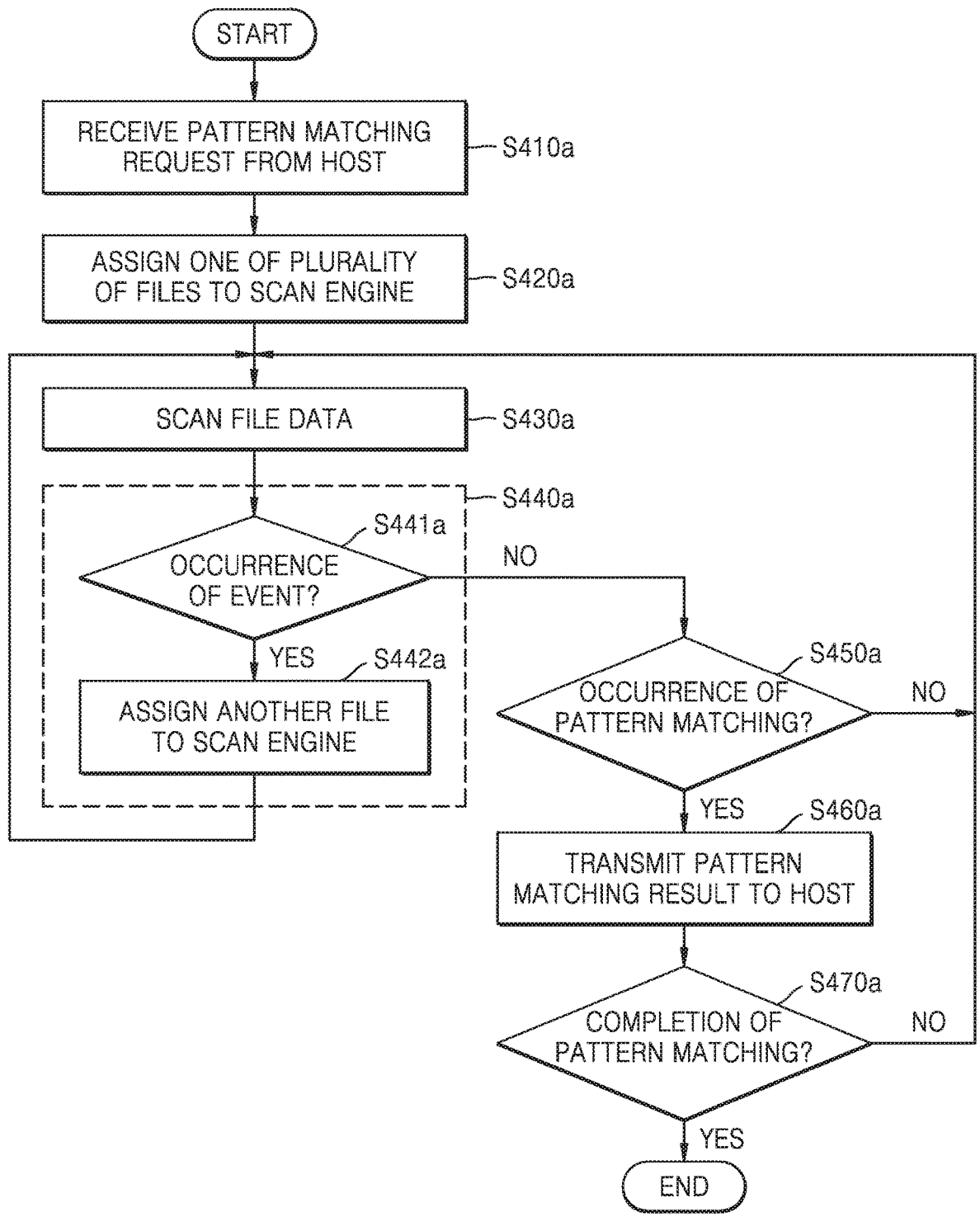
FIG. 12 is a flowchart illustrating an example of an operation of a storage system, according to an example embodiment of the present disclosure.

FIG. 12 is a flowchart illustrating an example of an operation of a storage system, according to an example embodiment of the present disclosure. For example, the operation of FIG. 12 may be performed by the storage system 10 of FIG. 1. FIG. 12 will be described hereinafter with reference to FIG. 1.

Referring to FIG. 12, in operation S410a, an operation of receiving the pattern matching request PM_REQ from a host may be performed. For example, the pattern matching accelerator 400 included in the storage system 10 may receive the pattern matching request PM_REQ from the host 20 via the host interface 100, and the pattern matching request PM_REQ, for example, as described above with reference to FIGS. 2A to 2C, may include the pattern information P_INFO and/or the file information F_INFO.

In operation S420a, an operation of assigning one of a plurality of files to a scan engine may be performed. For example, the scheduler 420 included in the pattern matching accelerator 400 may assign one of a plurality of files to a scan engine. That is, the scheduler 420 may provide the data stream STR from the file data F_DATA that corresponds to the assigned file to the scan engine 410, and may provide the control signal CTR to the scan engine 410 so as to start a scan operation. In operation S430a, an operation of scanning the file data F_DATA may be performed. For example, the scan engine 410 may scan the file data F_DATA that corresponds to the file assigned by the scheduler 420, based on the pattern information P_INFO.

In operation S440a, an operation of dynamically scanning a file to the scan engine may be performed. In detail, in operation S441a, an operation of determining the occurrence of an event may be performed. For example, the scheduler 420 may monitor an event causing the scan operation of the scan engine 410 to stop and thus may determine the occurrence of an event. When the event occurs, operation S442a may be performed subsequently, whereas, when no event occurs, operation S450a may be performed subsequently.

In the operation S442a, an operation of assigning another file to the scan engine may be performed. For example, the scheduler 420 may assign a file different from the file assigned to the scan engine 410 to the scan engine 410. The scheduler 420 may stop the scan operation of the scan engine 410 and store a context of the scan engine 410 and then may load a context corresponding to a scan operation of another file to the scan engine 410 and control the scan engine 410 to start a scan operation. As illustrated in FIG. 12, the operation S430a may be performed after the operation S442a.

In the operation S450a, an operation of determining the occurrence of pattern matching may be performed. For example, the scan engine 410 may scan the file data F_DATA based on the pattern information P_INFO and thus may determine the occurrence of pattern matching. When pattern matching does not occur, the operation S430a may be performed subsequently, whereas, when pattern matching occurs, operation S460a may be performed subsequently.

In the operation S460a, an operation of transmitting the pattern matching result PM_RES to the host may be performed. For example, the pattern matching accelerator 400, as described above with reference to FIG. 3, may transmit the pattern matching result PM_RES including the file identifier F_ID and information indicating a location in the file data F_DATA where a matched pattern is found to the host 20 via the host interface 100. Although FIG. 12 illustrates an example of transmitting, when pattern matching occurs, the pattern matching result PM_RES to the host, in some embodiments, the pattern matching result PM_RES may be transmitted to the host when pattern matching occurs two or more times, and/or may be transmitted to the host after pattern matching is completed, subsequent to operation S470a.

In the operation S470a, an operation of determining whether pattern matching is completed may be performed.

For example, the scheduler 420 may determine whether a scan operation regarding the file data F_DATA of at least one file included in the pattern matching request PM_REQ is completed by the scan engine 410. When pattern matching is not completed, the operation S430a may be performed subsequently, whereas, when pattern matching is completed, an operation of the storage system started in response to a pattern matching request may be finished.

Figure 13:
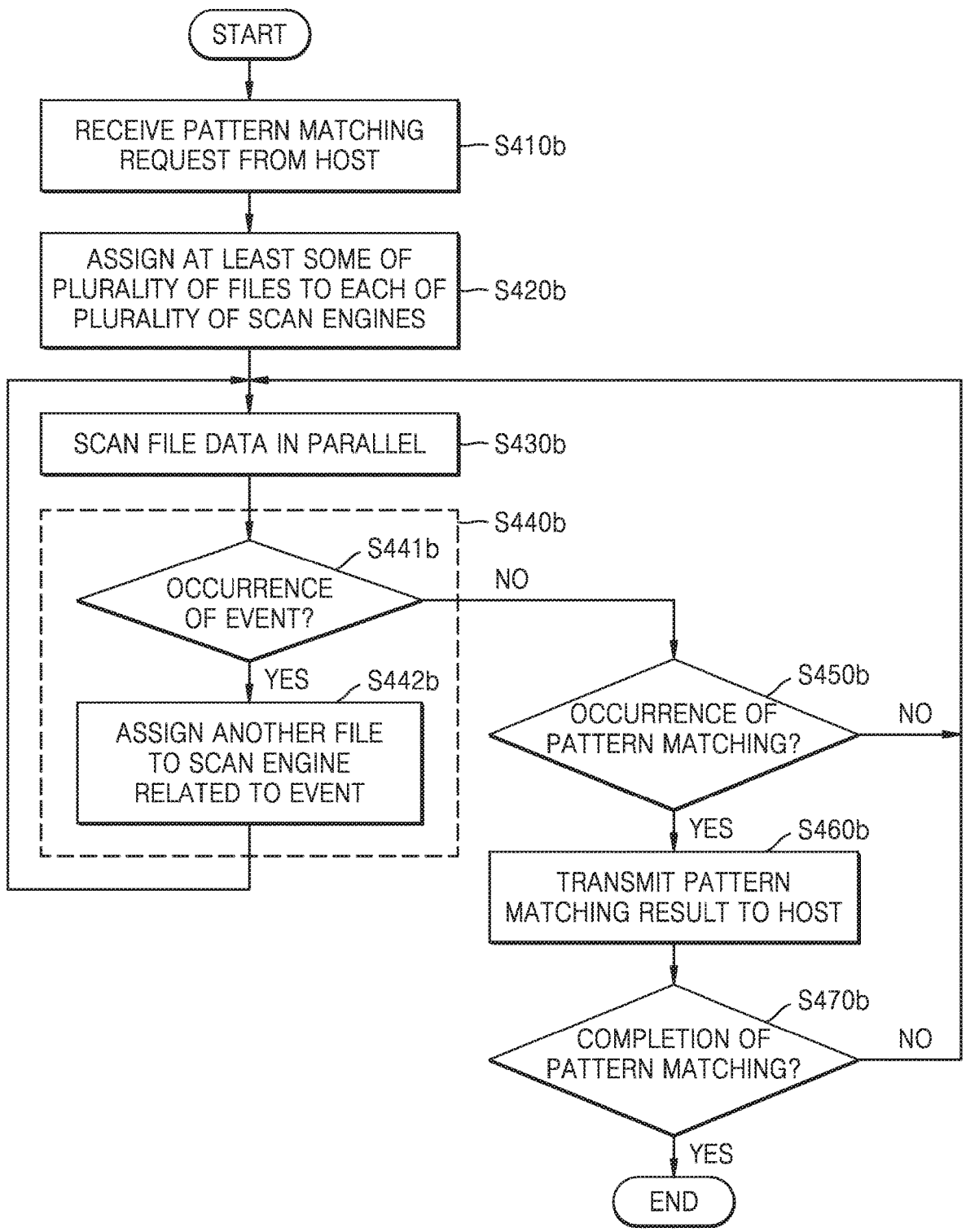
FIG. 13 is a flowchart illustrating an example of an operation of a storage system, according to an example embodiment of the present disclosure.

FIG. 13 is a flowchart illustrating an example of an operation of a storage system, according to an example embodiment of the present disclosure. For example, the operation of FIG. 13 may be performed by a storage system including the pattern matching accelerator 400c of FIG. 10.

Referring to FIG. 13, in operation S410b, an operation of receiving the pattern matching request PM_REQ from a host may be performed. For example, the pattern matching accelerator 400c may receive the pattern matching request PM_REQ from a host via a host interface (for example, 100 of FIG. 1), and the pattern matching request PM_REQ may include the pattern information P_INFO and the file information F_INFO.

In operation S420b, an operation of assigning at least some of a plurality of files to each of a plurality of scan engines may be performed. For example, the scheduler 420c may assign one of the plurality of files to one of the scan engines 410c. Next, in operation S430b, an operation of scanning the file data F_DATA in parallel may be performed. For example, the scan engines 410c may perform scan operations independently from each other.

In operation S440b, an operation of dynamically assigning at least some of the plurality of files to each of the plurality of scan engines may be performed. In detail, in operation S441b, an operation of determining the occurrence of an event may be performed. For example, the scheduler 420c may monitor an event causing at least one of the scan operations of the scan engines 410c to stop and thus may determine the occurrence of an event. When the event occurs, operation S442b may be performed subsequently, whereas, when no event occurs, operation S450b may be performed subsequently.

In the operation S442b, an operation of assigning another file to a scan engine that is related to the event may be performed. For example, the scheduler 420c may store a context of a scan engine from among the scan engines 410c, the scan operation of which is stopped or will be stopped by the event, and then may load a context corresponding to a scan operation of another file to the scan engine and control the scan engine to start the scan operation. As illustrated in FIG. 13, the operation S430b may be performed after the operation S442b.

In the operation S450b, an operation of determining the occurrence of pattern matching may be performed. For example, the scan engine 410 may scan the file data F_DATA based on the pattern information P_INFO and thus may determine the occurrence of pattern matching. When pattern matching does not occur, the operation S430b may be performed subsequently, whereas, when pattern matching occurs, operation S460b may be performed subsequently.

In the operation 460b, an operation of transmitting the pattern matching result PM_RES to the host may be performed. For example, the pattern matching accelerator 400c may provide the pattern matching result PM_RES including the file identifier F_ID and information indicating a location in the file data F_DATA where a matched pattern is found to the host via the host interface (for example, 100 of FIG. 1). Although FIG. 13 illustrates an example of transmitting, when pattern matching occurs, the pattern matching result PM_RES to the host, in some embodiments, the pattern matching result PM_RES may be transmitted to the host when pattern matching occurs two or more times, and/or may be transmitted to the host after pattern matching is completed, subsequent to operation S470b.

In the operation S470b, an operation of determining whether pattern matching is completed may be performed. For example, the scheduler 420c may determine whether a scan operation regarding the file data F_DATA of at least one file included in the pattern matching request PM_REQ is completed by the scan engines 410c. When pattern matching is not completed, the operation S430b may be performed subsequently, whereas, when pattern matching is completed, an operation of the storage system started in response to a pattern matching request may be finished.

Figure 14:
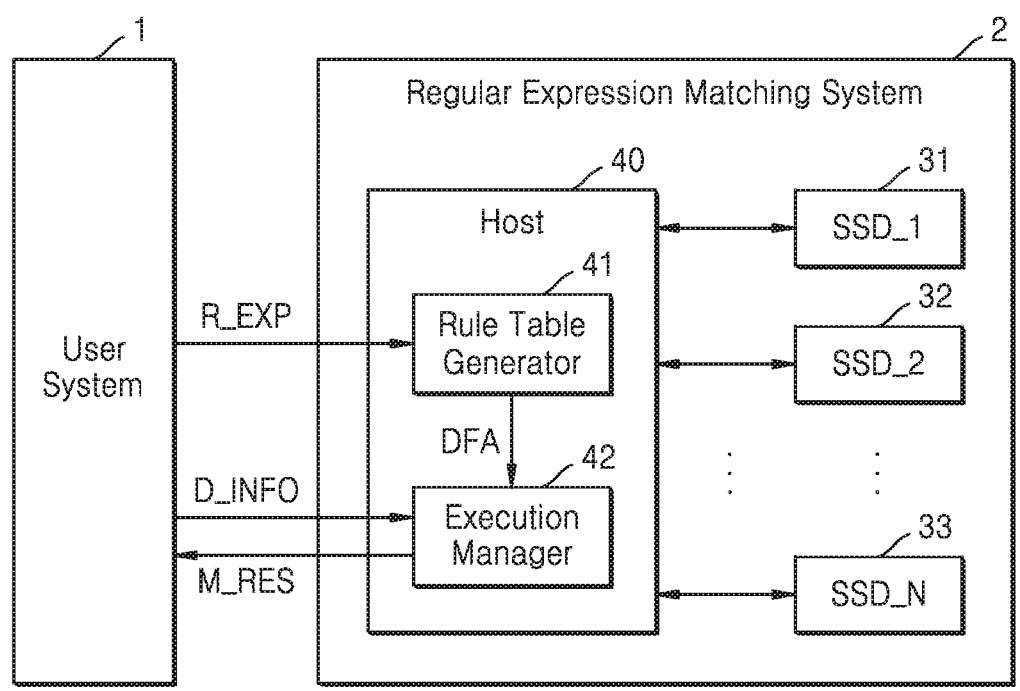
FIG. 14 is a block diagram illustrating a regular expression matching system including a storage system, according to an example embodiment of the present disclosure.

FIG. 14 is a block diagram illustrating a regular expression matching system 2 including a storage system, according to an example embodiment of the present disclosure. As illustrated in FIG. 14, the regular expression matching system 2 may include a storage system according to an example embodiment of the present disclosure.

A user system 1 may provide a regular expression R_EXP and data information D_INFO to the regular expression matching system 2, and may receive a matching result M_RES from the regular expression matching system 2. A regular expression may refer to a string defining a certain pattern, and a collection of strings having a certain rule may be defined by the regular expression. The user system 1 may be, as non-limiting examples, a terminal that a user uses or a search system that provides a search service to a final user, and may be an entity that intends to obtain a portion matching the regular expression R_EXP from data defined by the data information D_INFO.

As illustrated in FIG. 14, the regular expression matching system 2 may include a plurality of storage systems 31 to 33 and a host 40, and the plurality of storage systems 31 to 33 may communicate with the host 40. The plurality of storage systems 31 to 33 may be, as illustrated in FIG. 14, SSDs, and according to previous example embodiments of the present disclosure, may perform pattern matching in response to a pattern matching request of the host 40. For example, a first SSD 31 may include a pattern matching accelerator, and the pattern matching accelerator may dynamically assign a file to a scan engine in response to the pattern matching request PM_REQ received from the host 40 and thus may provide pattern matching having increased efficiency. In addition, the pattern matching accelerator may include a plurality of scan engines, and may mutually exclusively dynamically assign at least some of a plurality of files to each of the plurality of scan engines.

The host 40 may include a rule table generator 41 and an execution manager 42. The rule table generator 41 may receive the regular expression R_EXP from the user system 1, and may generate DFA based on the regular expression R_EXP and provide the DFA to the execution manager 42. The DFA may indicate a pattern corresponding to the regular expression R_EXP, and may be transmitted in the form of an STRT to one of the storage systems 31 to 33 via the execution manager 42. The execution manager 42 may determine, based on file information included in the data information D_INFO, a storage system from among the storage systems 33 to 33 storing a file, and may provide the pattern matching request PM_REQ including information regarding the file and the DFA to the determined storage system. Also, the execution manager 42 may receive the pattern matching result PM_RES that at least some of the storage systems 31 to 33 provide by performing pattern matching in response to the pattern matching request PM_REQ, and may generate the matching result M_RES based on the received pattern matching result PM_RES and provide the matching result M_RES to the user system 1.

While the inventive concept has been particularly shown and described with reference to embodiments thereof, it will be understood that various changes in form and details may be made therein without departing from the spirit and scope of the following claims.

What is claimed is:

1. A storage system comprising:
   a data storage device, including at least one non-volatile memory device, configured to store a plurality of files, the plurality of files including a first file and a second file;
   a host interface configured to receive, from a host, a pattern matching request, the pattern matching request including pattern information and file information regarding the plurality of files, and to transmit, to the host, a result of pattern matching regarding the plurality of files; and
   a pattern matching accelerator configured to perform the pattern matching in response to the pattern matching request,
   wherein the pattern matching accelerator comprises a scan engine configured to scan the first file for the pattern matching, and a scheduler configured to control the scan engine to stop scanning the first file and start scanning the second file.

2. The storage system of claim 1, wherein the pattern matching request comprises a requirement regarding at least one of a completion time of the pattern matching, an order of priority of the pattern matching, and a method of the pattern matching, and the scheduler is further configured to control the scan engine based on the requirement.

3. The storage system of claim 1, further comprising a storage controller configured to process a request from the host to access the data storage device by managing the at least one non-volatile memory, and
   the scheduler is further configured to control the scan engine based on information regarding the data storage device provided from the storage controller.

4. The storage system of claim 3, wherein the information regarding the data storage device comprises a read latency required to read data from the at least one non-volatile memory, and
   the scheduler is further configured to control the scan engine to start the scanning of the second file when the read latency of data comprised in the first file is equal to or greater than a reference value.

5. The storage system of claim 1, wherein the pattern matching accelerator comprises a report queue configured to temporarily store a scan result of the scan engine, and
   the scheduler is further configured to control the scan engine to start the scanning of the second file when storing of the scan result regarding the first file in the report queue is delayed.

6. The storage system of claim 1, wherein the pattern matching accelerator comprises data buffers configured to store at least one portion of each of the first and second files, and
   the scheduler is further configured to control the scan engine to start the scanning of the second file when a size of the at least one portion of the first file stored in the data buffers, which is to be scanned subsequently by the scan engine, is less than a reference value.

7. The storage system of claim 1, wherein the scheduler is further configured to control the scan engine to start the scanning of the second file when an error occurs during the scanning of the first file by the scan engine.

8. The storage system of claim 1, wherein the pattern information comprises information regarding a plurality of patterns, and
the scheduler is further configured to dynamically assign at least some of the plurality of patterns to the scan engine for the pattern matching.

9. The storage system of claim 1, wherein the pattern matching accelerator comprises a plurality of state registers configured to store state information of the scan engine, and
the scheduler is further configured to store the state information of the scan engine in a first state register when the scanning of the first file stops, and load the state information that is stored in a second state register to the scan engine when the scanning the second file starts.

10. A storage system configured to be connected to a host, the storage system comprising:
a data storage device, including at least one non-volatile memory device, configured to store a plurality of files;
a host interface configured to receive, from the host, a pattern matching request comprising pattern information and file information regarding the plurality of files, and transmit, to the host, a result of pattern matching regarding the plurality of files; and
a pattern matching accelerator configured to perform the pattern matching in response to the pattern matching request,
wherein the pattern matching accelerator comprises a plurality of scan engines configured to scan data based on a pattern, and a scheduler configured to dynamically assign at least some of the plurality of files to each of the plurality of scan engines for the pattern matching, and
based on a stopping of the pattern matching of a first file of the plurality of files by the one of the plurality of scan engines, the scheduler is configured to assign a second file of the plurality of files to one of the plurality of scan engines.

11. The storage system of claim 10, wherein the pattern matching request comprises a requirement regarding at least one of a completion time of the pattern matching, an order of priority of the pattern matching, and a method of the pattern matching, and
the scheduler is further configured to dynamically assign, based on the requirement, the at least some of the plurality of files to each of the plurality of scan engines.

12. The storage system of claim 10, further comprising a storage controller,
the storage controller being configured to process an access request of the host to the data storage device by managing the at least one non-volatile memory, and
the scheduler being further configured to dynamically assign, based on information regarding the data storage device provided from the storage controller, the at least some of the plurality of files to each of the plurality of scan engines.

13. The storage system of claim 12, wherein the information regarding the data storage device comprises a read latency required to read data from the at least one non-volatile memory, and
the scheduler is further configured to assign, when the read latency of data included in a file assigned to one of the scan engines is equal to or greater than a reference value, another file to the scan engine.

14. The storage system of claim 10, wherein the pattern information comprises information regarding a plurality of patterns, and
the scheduler is further configured to dynamically assign at least some of the plurality of patterns to the scan engines as the pattern.

15. The storage system of claim 10, wherein the pattern matching accelerator comprises a plurality of state registers configured to store state information of the plurality of scan engines, and
the scheduler is further configured to store, when scanning a file assigned to one of the scan engines stops, the state information of the scan engine in a first state register, and load, when scanning another file starts, the state information that is stored in a second state register to the scan engine.

16. A method of operating a storage system configured to store a plurality of files, the method comprising:
receiving, from the host, a pattern matching request comprising pattern information and file information regarding the plurality of files;
performing pattern matching on the plurality of files in response to the pattern matching request; and
transmitting, to the host, a result of the pattern matching,
wherein the performing of the pattern matching comprises:
dynamically assigning at least some of the plurality of files to a plurality of scan engines such that based on a stopping of the pattern matching of a first file of the plurality of files by the one of the plurality of scan engines, a second file of the plurality of files is assigned to one of the plurality of scan engines; arid
scanning, by each of the plurality of scan engines, data included in an assigned file based on a pattern.

17. The method of claim 16, wherein the pattern matching request comprises a requirement regarding at least one of a completion time of the pattern matching, an order of priority of the pattern matching, and a method of the pattern matching, and
the assigning is based on the requirement.

18. The method of claim 17, further comprising:
determining, based on states of the scan engines, whether the pattern matching satisfies the requirement; and
transmitting, to the host, when the requirement is not satisfied, information regarding the pattern matching.

19. The method of claim 17, further comprising processing an access request of the host regarding the storage system by managing at least one non-volatile memory, and providing information regarding the storage system,
wherein the storage system comprises the at least one non-volatile memory, and
the assigning is based on the information regarding the storage system.

20. The method of claim 19, wherein the information regarding the storage system comprises a read latency required to read data from the at least one non-volatile memory, and
the assigning being performed, when the read latency of data comprised in a file assigned to one of the scan engines is equal to or greater than a reference value, another file to the scan engine.

* * * * *